US009440187B2

(12) United States Patent
Alkhazraji et al.

(10) Patent No.: US 9,440,187 B2
(45) Date of Patent: Sep. 13, 2016

(54) DEVICE FOR WATER COLLECTION FROM ATMOSPHERIC MOISTURE

(71) Applicant: The Petroleum Institute, Abu Dhabi (AE)

(72) Inventors: Saeed Alhassan Alkhazraji, Abu Dhabi (AE); Sara Mohamed Aldhaheri, Abu Dhabi (AE); Fatima Mohamed Alhameli, Abu Dhabi (AE)

(73) Assignee: THE PETROLEUM INSTITUTE, Abu Dhabi (AE)

( * ) Notice: Subject to any disclaimer, the term of this patent is extended or adjusted under 35 U.S.C. 154(b) by 8 days.

(21) Appl. No.: 14/331,614

(22) Filed: Jul. 15, 2014

(65) Prior Publication Data

US 2015/0020687 A1  Jan. 22, 2015

Related U.S. Application Data

(60) Provisional application No. 61/856,744, filed on Jul. 21, 2013.

(51) Int. Cl.
| | |
|---|---|
| *B01D 53/26* | (2006.01) |
| *B01D 53/04* | (2006.01) |
| *B01D 53/28* | (2006.01) |
| *B01J 20/26* | (2006.01) |
| *E03B 3/28* | (2006.01) |

(52) U.S. Cl.
CPC .......... *B01D 53/261* (2013.01); *B01D 53/0407* (2013.01); *B01D 53/28* (2013.01); *B01J 20/261* (2013.01); *E03B 3/28* (2013.01); *B01D 2253/202* (2013.01)

(58) Field of Classification Search
CPC .. B01D 53/28; B01D 53/261; B01D 53/263; B01D 53/0407; B01D 2253/202; B01J 20/261

USPC ................. 96/108, 118–120, 147; 252/194
See application file for complete search history.

(56) References Cited

U.S. PATENT DOCUMENTS

| | | | | | |
|---|---|---|---|---|---|
| 2,341,893 | A | * | 2/1944 | Baker ..................... | F24F 3/1411 96/119 |
| 5,148,613 | A | * | 9/1992 | Cullen ................. | B01D 53/261 206/204 |
| 5,215,561 | A | * | 6/1993 | Cameron ............. | B01D 53/261 96/119 |
| 5,534,186 | A | * | 7/1996 | Walker ................. | B01D 53/261 252/194 |
| 5,846,296 | A | * | 12/1998 | Krumsvik ............ | B01D 5/0066 95/115 |

(Continued)

FOREIGN PATENT DOCUMENTS

WO     WO 2013/014315 A1 *  1/2013

*Primary Examiner* — Frank Lawrence
(74) *Attorney, Agent, or Firm* — Hayes Soloway, P.C.

(57) ABSTRACT

A device for collecting water from atmospheric moisture comprises water absorbing material, a protection wall and a water container. The protection wall is in a porous form. The water absorbing material is made of the temperature responsive polymer with a phase separation temperature, including Poly(N-isopropylacrylamide) (PNIPAM), Poly(vinylphosphonate) and etc. when its temperature is below phase separation temperature, the temperature responsive polymer is in a swollen hydrated state, forming hydrogen bond with water molecules; so as to absorb water from the air. When its temperature is above said phase separation temperature, the temperature responsive polymer is in a shrunken dehydrated state, forming hydrogen bond with other temperature responsive polymer molecules; so as to expel the water to the water container.

13 Claims, 3 Drawing Sheets

(56) References Cited

U.S. PATENT DOCUMENTS

| | | | |
|---|---|---|---|
| 6,273,942 B1 * | 8/2001 | Jersby | F26B 21/083 55/424 |
| 6,767,521 B1 * | 7/2004 | Vogt | A61L 9/012 206/0.5 |
| 6,843,936 B1 * | 1/2005 | Jacobs | B01D 53/28 252/194 |
| 7,467,523 B2 * | 12/2008 | Vetrovec | B01D 5/0066 202/234 |
| 9,005,351 B2 * | 4/2015 | Tornel Garcia | B01D 53/0407 156/213 |
| 2006/0137530 A1 * | 6/2006 | Yeager | B01D 53/261 96/154 |
| 2007/0119301 A1 * | 5/2007 | Abe | B01D 53/261 95/117 |

\* cited by examiner

Poly (N-isopropylacrylamide)

Poly (vinylphosphonate)

DEVICE FOR WATER COLLECTION FROM ATMOSPHERIC MOISTURE

CROSS REFERENCE TO RELATED APPLICATION

This application claims the benefit of U.S. Provisional Application No. 61/856,744, filed Jul. 21, 2013, which is incorporated herein by reference in its entirety.

FIELD OF INVENTION

The present invention relates to the technology of water collection and generation. More specifically, it is a device for collecting water from the atmospheric moisture with no need of energy input except for solar radiation.

BACKGROUND OF THE INVENTION

Water is one of the most important resources for human and all known forms of lives on earth. Without water, most of the lives on earth, including human beings, are going to cease to exist. It seems that there are enough water resources on earth, as over 71% of the earth surface is covered by water. However, two factors make water become a scarce resource for most humans on earth.

First, not every types of water are similar. Human being and most other life forms as well, can only drink or use fresh water. However, on earth, 96.5% of the planet's water is found in seas and oceans. Only 2.5% of the earth's water is fresh water, and 98.8% of the fresh water is in ice and groundwater, which are not easily accessible. And less than 0.3% of the freshwater is in rivers, lakes and etc. Accordingly, only a very tiny portion of the total water on earth can be directly used by human.

Second, such small portion of fresh water is not evenly distributed among different regions. As for the regions with large fresh water body, such as river or lake, the fresh water supply may not be an issue. However, for many other regions where there is no river and lake nearby, and most of them being desert or other kind of arid areas, the availability of fresh water is a big concern, or even a health or life threatening issue. Moreover, even for the people to whom the availability of fresh water is not an issue, the quality of the fresh water may still be a big problem. Many of such rivers and lakes have already been polluted by industrial wastes, agricultural chemicals such as fertilizer and pesticides.

Water is the indispensable resource for human lives, as well as for most of the human activities, including drinking, washing, agriculture irrigation, industrial applications . . . etc. So, on one hand, human need more and more freshwater to support the life, activity and production. On the other hand, the availability and quality of fresh water is a serious issue.

In light of the foregoing, a wide variety of approaches have been developed to get more fresh water from other sources, such as brine in the ocean and the humidity in the atmosphere. Sea water desalination is a field with many well developed technologies, such as reverse osmosis, forward osmosis, molecular screening, electromagnetic deionization, vacuum distillation, multi-stage flash distillation, vapor compression desalination . . . etc. In many countries, sea water desalination is a vital source of fresh water supply. The world's largest desalination plant is the Jebel Ali Desalination Plant in the United Arab Emirates. However, all of the desalination processes are energy intensive and costly, hence these methods have major drawbacks. In addition, no matter how the desalination technology will be developed in the future, the fundamental physics law determines that a minimum energy consumption is a must, and it cannot be less than 1 kWh/m$^3$.

Therefore, concerning the costs, the other approach that collects water from the atmosphere becomes more favorable; and this is especially true for the areas with the environmental and weather condition suitable for such an approach, such as many coastal arid areas and desert areas around the world.

In addition, due to the perpetual water cycle (hydrologic cycle) on earth, the water (moisture) in the atmosphere is inexhaustible and dynamic. The water is continuously exchanged between the atmosphere, soil water, surface water, groundwater, and plants. During this process, the water evaporates from oceans, rivers, lakes and other water bodies into the air. So the resource of moisture is always available for water collection.

Accordingly, one objective of the present invention is to design a new device for the water collection from the atmospheric moisture with the minimal energy input by humans and minimum human intervention and minimum maintenance, as well as utilizing the specific material with suitable properties as the water absorbing material in the device, so as to achieve the aforementioned objective.

SUMMARY OF INVENTION

In many places of the world, water is not adequate or even scarce. In addition, the availability and/or cost of energy may be not desirable. In this regard, an efficient, convenient and low cost device or process for collecting water from sources such as atmospheric moisture is always in urgent need.

Accordingly, one principal objective of the present invention is to provide a device to collect water from the atmospheric moisture, which is highly efficient, easy to use, with low cost, and meanwhile, does not need energy input except for solar radiation. In one aspect of the present invention, it has provided that this device includes a type of water absorbing material, a porous protection wall and a water container. In another aspect of the present invention, it has further provided that the water absorbing material could be certain temperature responsive polymer with a phase separation temperature, including Poly(N-isopropylacrylamide) (PNIPAM), Poly(vinylphosphonate). In this way, when its temperature is below phase separation temperature, the temperature responsive polymer is in a swollen hydrated state, forming hydrogen bond with water molecules; so as to absorb water from the air. Further, when its temperature is above that phase separation temperature, the temperature responsive polymer is in a shrunken dehydrated state, forming hydrogen bond with other temperature responsive polymer molecules; so as to expel the water to the water container.

The present invention provides a desirable way to collect water directly from atmospheric moisture. More importantly, it does not need any extra energy in addition to solar radiation. Therefore, it has significant technical and economical advantages.

As a first aspect of the invention, there is provided a device for collecting water from atmospheric moisture, comprising
  a water absorbing material;
  a protection wall;
  a water container;

the water absorbing material absorbing water from the atmospheric moisture;

the protection wall protecting the water absorbing material and the water collector from being contaminated or damaged;

the protection wall allowing air to pass through with no hindrance; and the water container being connected to the water absorbing material so as to collect the water from the water absorbing material.

Preferably, the protection wall is in a porous form to allow air with moisture to pass through; and the protection wall is made of a material that does not allow absorbing moisture in air.

Preferably, the water container is made of a material that does not allow absorbing moisture in air; and the water container comprises means to prevent the water contained in the container from evaporating to air.

Preferably, the device comprising the water absorbing material being a temperature responsive polymer with a phase separation temperature;

the temperature responsive polymer undergoing water solubility change when its temperature goes from above the phase separation temperature to below the phase separation temperature;

the temperature responsive polymer undergoing water solubility change when its temperature goes from below the phase separation temperature to above the phase separation temperature;

when its temperature is below the phase separation temperature, the temperature responsive polymer being in a swollen hydrated state, and the temperature responsive polymer forming hydrogen bond with water molecules;

when its temperature is below the phase separation temperature, the temperature responsive polymer absorbing water from atmospheric moisture;

when its temperature is above the phase separation temperature, the temperature responsive polymer being in a shrunken dehydrated state, and the temperature responsive polymer forming hydrogen bond with side groups of adjacent temperature responsive polymer molecule; and when its temperature is above the phase separation temperature, the temperature responsive polymer expelling water from its structure.

Preferably, the phase separation temperature is 32° C.

Preferably, the temperature responsive polymer is Poly(N-isopropylacrylamide) (PNIPAM).

Preferably, the temperature responsive polymer is Poly(vinylphosphonate).

Preferably, the temperature responsive polymer is selected from the group consisting of hydroxypropylcellulose, poly(vinylcaprolactame) and polyvinyl methyl ether.

Preferably, the phase separation temperature is adjustable from 5° C. to 90° C.; and the phase separation temperature being adjusted via altering type of the temperature responsive polymer, concentration of the temperature responsive polymer, or modifying the temperature responsive polymer's structure.

Preferably, the temperature responsive polymer being a standing alone component of the device, or the temperature responsive polymer being grafted on a surface of a supporting element.

As a further aspect of the invention, there is provided a device for collecting water from atmospheric moisture, comprising a water absorbing material;
a protection wall;
a water container;

the water absorbing material absorbing water from the atmospheric moisture;

the protection wall protecting the water absorbing material and the water collector from being contaminated or damaged;

the protection wall allowing air to pass through with no hindrance;

the water container being connected to the water absorbing material so as to collect the water from the water absorbing material;

the protection wall being in a porous form to allow air with moisture to pass through;

the protection wall being made of a material that does not allow absorbing moisture in air;

the water container being made of a material that does not allow absorbing moisture in air; and the water container comprising means to prevent the water contained in the container from evaporating to air.

Preferably, the device comprising:

the water absorbing material being a temperature responsive polymer with a phase separation temperature;

the temperature responsive polymer undergoing water solubility change when its temperature goes from above the phase separation temperature to below the phase separation temperature;

the temperature responsive polymer undergoing water solubility change when its temperature goes from below the phase separation temperature to above the phase separation temperature;

when its temperature is below the phase separation temperature, the temperature responsive polymer being in a swollen hydrated state, and the temperature responsive polymer forming hydrogen bond with water molecules;

when its temperature is below the phase separation temperature, the temperature responsive polymer absorbing water from atmospheric moisture;

when its temperature is above the phase separation temperature, the temperature responsive polymer being in a shrunken dehydrated state, and the temperature responsive polymer forming hydrogen bond with side groups of adjacent temperature responsive polymer molecule; and when its temperature is above the phase separation temperature, the temperature responsive polymer expelling water from its structure.

Preferably, the phase separation temperature is 32° C.; and the temperature responsive polymer is Poly(N-isopropylacrylamide) (PNIPAM).

Preferably, the temperature responsive polymer is selected from the group consisting of hydroxypropylcellulose, poly(vinylcaprolactame), polyvinyl methyl ether, and Poly(vinylphosphonate).

Preferably, the device comprising:

the phase separation temperature being adjustable from 5° C. to 90° C.; and the phase separation temperature being adjusted via altering type of the temperature responsive polymer, concentration of the temperature responsive polymer, or modifying the temperature responsive polymer's structure.

Preferably, the device for collecting water from atmospheric moisture comprising the temperature responsive polymer being a standing alone component of the device, or the temperature responsive polymer being grafted on a surface of a supporting element.

As a further aspect of the invention, there is provided a device for collecting water from atmospheric moisture, comprising:

a water absorbing material;
a protection wall;
a water container;
the water absorbing material absorbing water from the atmospheric moisture;
the protection wall protecting the water absorbing material and the water collector from being contaminated or damaged;
the protection wall allowing air to pass through with no hindrance;
the water container being connected to the water absorbing material so as to collect the water from the water absorbing material;
the protection wall being in a porous form to allow air with moisture to pass through;
the protection wall being made of a material that does not allow absorbing moisture in air;
the water container being made of a material that does not allow absorbing moisture in air;
the water container comprising means to present the water contained in the container from evaporating to air;
the water absorbing material being a temperature responsive polymer with a phase separation temperature;
the temperature responsive polymer undergoing water solubility change when its temperature goes from above the phase separation temperature to below the phase separation temperature;
the temperature responsive polymer undergoing water solubility change when its temperature goes from below the phase separation temperature to above the phase separation temperature;
when its temperature is below the phase separation temperature, the temperature responsive polymer being in a swollen hydrated state, and the temperature responsive polymer forming hydrogen bond with water molecules;
when its temperature is below the phase separation temperature, the temperature responsive polymer absorbing water from atmospheric moisture;
when its temperature is above the phase separation temperature, the temperature responsive polymer being in a shrunken dehydrated state, and the temperature responsive polymer forming hydrogen bond with side groups of adjacent temperature responsive polymer molecule;
when its temperature is above the phase separation temperature, the temperature responsive polymer expelling water from its structure; and
the temperature responsive polymer being a standing alone component of the device, or
the temperature responsive polymer being grafted on a surface of a supporting element.

Preferably, the phase separation temperature being 32° C.; and the temperature responsive polymer being Poly(N-isopropylacrylamide) (PNIPAM).

Preferably, the temperature responsive polymer being selected from the group consisting of hydroxypropylcellulose, poly(vinylcaprolactame), polyvinyl methyl ether, and Poly(vinylphosphonate).

Preferably, the phase separation temperature being adjustable from 5° C. to 90° C.; and the phase separation temperature being adjusted via altering type of the temperature responsive polymer, concentration of the temperature responsive polymer, or modifying the temperature responsive polymer's structure.

DETAILED DESCRIPTION OF THE INVENTION

Hereinafter, the objective, conception and implementation of the present invention will be described in details. All the descriptions are for the purpose of describing selected versions of the present invention and are not intended to limit the scope of the present invention.

In comparison to the sea water desalination, the water generation or collection from the atmospheric moisture is more energy efficient and environmentally friendly. Due to the fact that the moisture in the atmosphere is mainly in the form of fresh molecular water, usually no separation process (including both chemical separation and physical separation) is necessary. Since water exist in the molecular form, it doesn't hold any salt because of the size of the molecule. However, fog and rain contain certain amount of salt because they have sizes that range from micrometer to centimeter and above. Therefore, the energy, as well as the related costs, for performing the separation has been saved. So, the focus of the present invention is to enhance the water collection efficiency with specific suitable material and further reduce the energy input (for process other than separation), and the cost as well.

Figure 1:
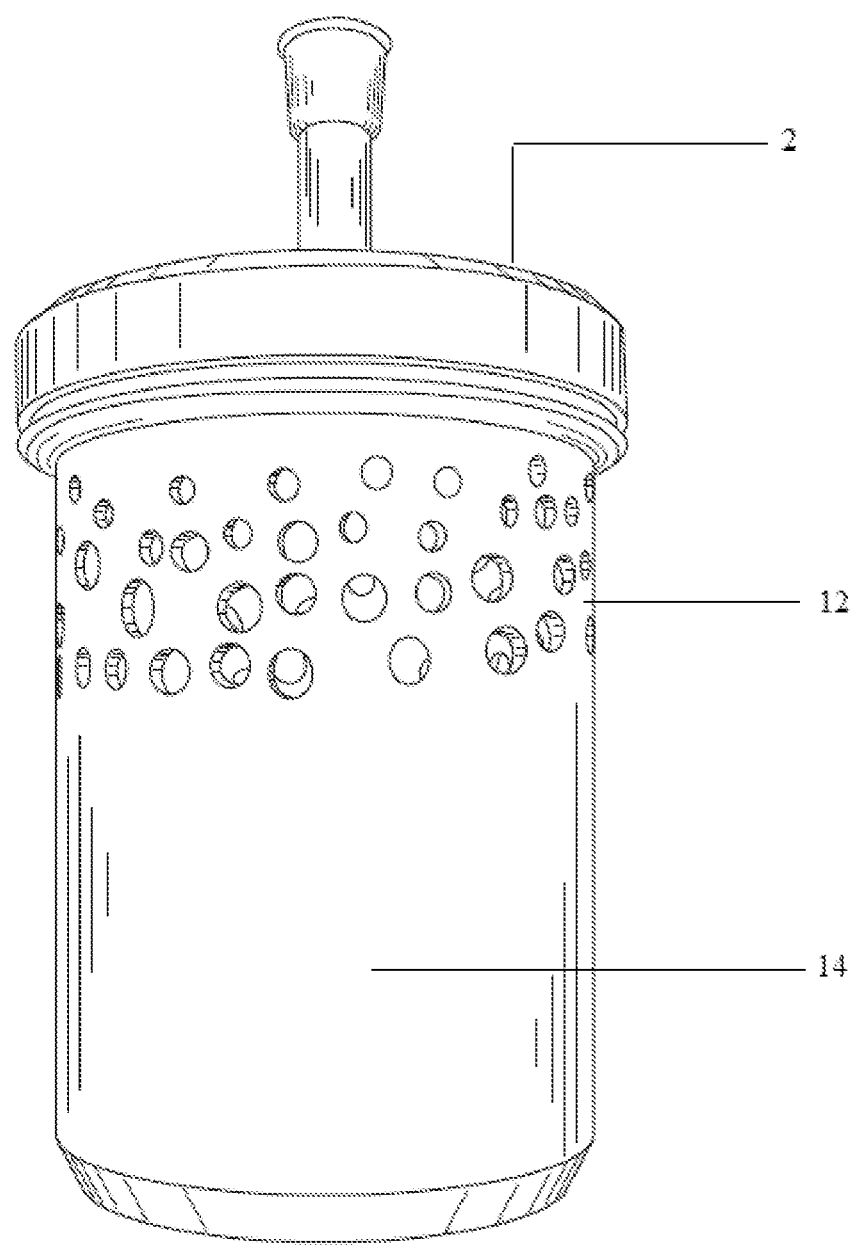
FIG. 1 depicts a first view of a device for collecting water from atmospheric moisture according to an embodiment of this invention.
Figure 2:
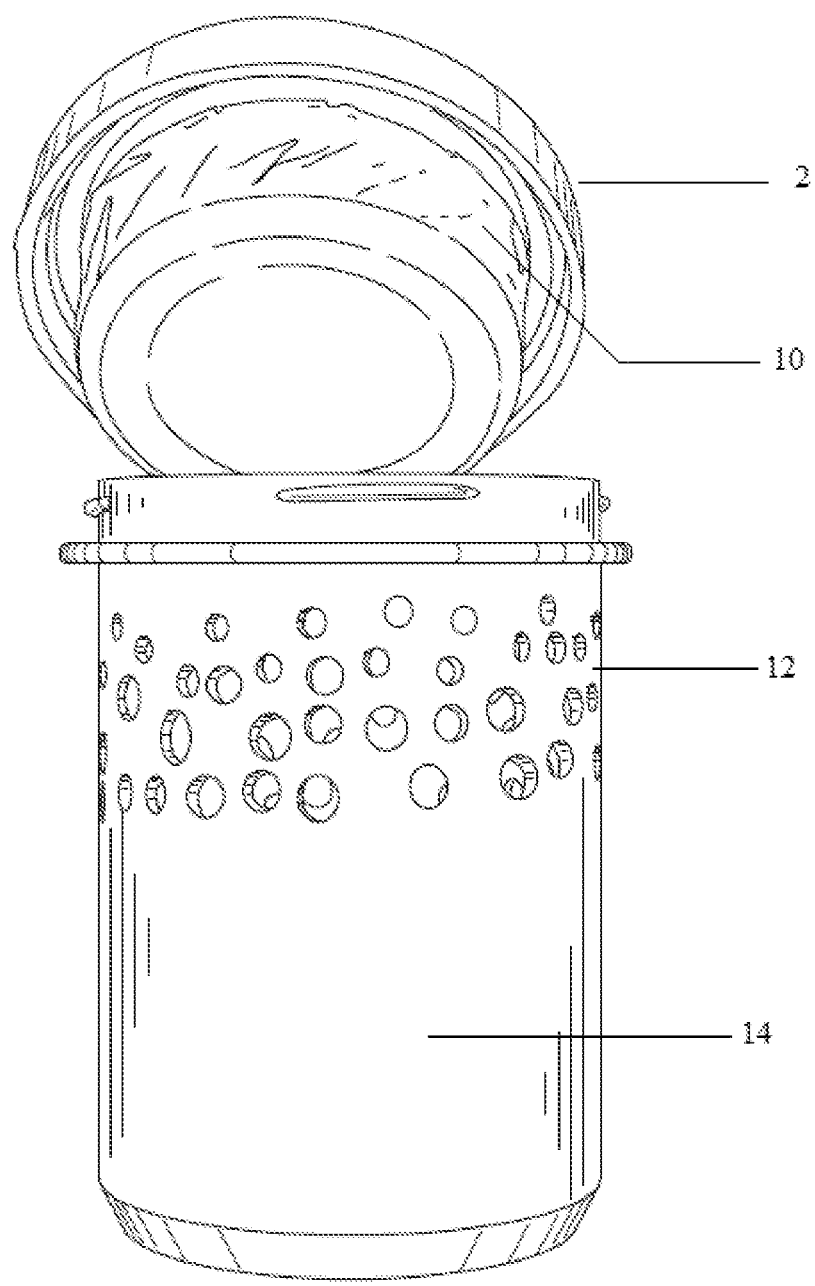
FIG. 2 depicts a second view of a device for collecting water from atmospheric moisture according to an embodiment of this invention.

As illustrated in FIGS. 1 and 2, basically, the device of the present invention 2 contains three major components, a specific material 10 that can efficiently absorb the moisture, a protection wall 12 that protects the water absorbing material and meanwhile, allow the moisture to pass through to get access to the absorbing material 10. The third part is the container 14 for water collection.

A person skilled in the art would appreciate that FIGS. 1 and 2 illustrate a simplistic representation of the device. The device according to the present invention can be made in different shapes, scales, configurations and dimensions without departing from the scope of the present invention.

Concerning the protection wall 12, it should allow the moisture or water vapor to pass through easily. In this way, the specific absorbing material 10 can get access to the moisture in the air, so as to collect it. The protection can be made of any suitable material. It covers the absorbing material from being contaminated or damaged from all environmental factors, which may reduce the water collection efficiency of the device. As mentioned before, it has to have the means to allow moisture pass through it easily. One way to achieve it is to make the protection wall in a porous form. So, the air with moisture can pass through it easily. On the other hand, the material used to make the protection wall 12 should not absorb water itself; such that the air with moisture can be accessed by the absorbing material lossless. Finally, it is preferred that this protection wall 12 should also allow the sunlight to access to the absorbing material 10. In the present invention, the solar energy from sunlight is the only energy required for the entire system. No other energy is required for the operation.

Concerning the water container 14, it has been designed to collect as much water from the absorbing material 10 as possible. Moreover, it also needs to be made of the material that does not absorb water. So, all of the water collected by the absorbing material 10 will be transferred to the external for water supply, as well as industrial or agricultural applications. Further, the collector should have certain means to prevent the collected water from evaporating back to the air again. Such procedures seem simple, yet functionally very important. Otherwise, a significantly portion of the collated water may be lost back to the air before it reaches the end user.

The absorbing material 10 is the most critical part of the water collection system of the present invention. It functions to absorb (collect) the moisture from air. In the present invention, with the objective of saving energy consumption as much as possible, a specific group of material, namely temperature responsive materials (e.g. polymers), has been selected as the absorbing material 10 in the water collection device 2. The reason is that albeit the approach of generation fresh water from the atmospheric moisture is energy efficient, in comparison to the desalination approach from the sea water. However, it still needs to consume a significant quantity of energy during its operation. The energy is not used to separate water from the salt. Rather, it is used to recover the collected water from the absorbing material 10 to the collection containers 14. In general, there are two methods to remove the collected water from the absorbing material 10 to a container or collector 14. One method is to press the absorbing material 10 by certain mechanical device to squeeze the water out from it. In this method, mechanical energy will be needed to drive the pressing operation. The other method is to heat the water containing absorbing material 10 to a temperature usually above 80° C., or even as high as 100° C. Accordingly, the water will be evaporated from the absorbing material, and next to be collected via the process of condensation. Apparently, in this method, heat energy needs to be input, in order to heat the collected water to those temperatures.

In regard to the aforementioned conventional methods to remove the collected water from the water absorbing material 10, both of them need certain amount of energy input by human. Such consumed energy will be added to the total costs of the water collection or generation and eventually, becomes the burden on the end users or consumers. Moreover, the continuous mechanical deformation (the pressing method), or heating cooling process will eventually damage the structure and functionality of the water absorbing material 10, which will certainly reduce the water collection efficiency of the whole device. So, in the present invention, a specific group of material, temperature responsive polymer, is used as the absorbing material 10 for water collection in the present invention.

Temperature responsive polymers is also called thermoresponsive polymer. It includes a group of polymer materials that exhibit a drastic and discontinuous change of their physical properties with temperature. Frequently, the property concerned is the material's solubility in a given solvent, such as water. But it may also be used when other properties are affected. Thermoresponsive polymers belong to the class of stimuli-responsive materials, in contrast to temperature-sensitive (for short, thermosensitive) materials, which change their properties continuously with environmental conditions.

The temperature at which such dramatic property (such as solubility) change occurs is called the phase separation temperature. Generally, the thermoresponsive polymer chains in solution adapt an expanded coil conformation. At the phase separation temperature they collapse to form compact globuli structure. When mechanisms which reduce surface tension are absent, the globule aggregates, subsequently expel the solvent, such as water, from its structure.

On the other hand, the phase separation temperature of the thermoresponsive polymer is adjustable. By virtue of change the concentration of the polymer, the phase separation temperature can be modified within a certain range. In the present invention, such property is very useful in order to make the water absorbing material, as well as the water collection device, functions in different areas, and under different climate conditions.

Figure 3:
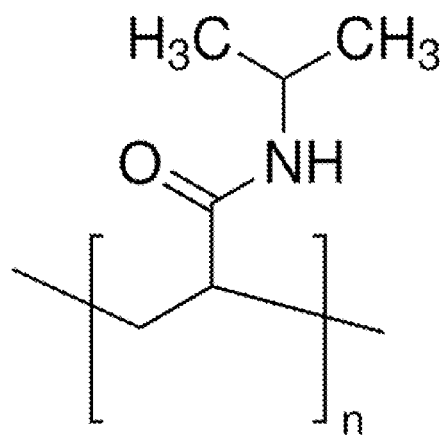
FIG. 3 is the structure of Poly(N-isopropylacrylamide) as the water absorbing material of the water collection device of the present invention.
Figure 4:
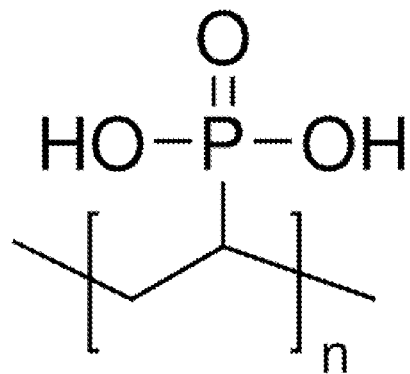
FIG. 4 is the structure of Poly(vinylphosphonate) as the water absorbing material of the water collection device of the present invention.

In the present invention, the water absorbing material 10 can be Poly(N-isopropylacrylamide) (for short, PNIPAM or NIPA), with its molecular formula as $(C_6H_{11}NO)_n$. Its structure has been shown in FIG. 3. In water, it forms a three-dimensional hydrogel. When heated in water to 32° C. (90° F.) or above, which is the phase separation temperature, it undergoes a reversible phase transition from a swollen hydrated state to a shrunken dehydrated state, losing about 90% of its volume. In dilute solution, it undergoes a corresponding coil-to-globule transition at similar conditions. In this way, the water absorbing materialPoly(N-isopropylacrylamide) automatically remove the collated water from itself when the temperature reaches 32° C. (90° F.) or higher. Moreover, when the temperature drops to below 32° C., the Poly(N-isopropylacrylamide) automatically absorb the moisture from the air again. The fundamental mechanism is that at the temperature below the phase separation temperature, the polymer forms hydrogen bond with the water ($H_2O$). So, it is able to absorb a large amount of water. While when the temperature becomes higher than that critical point (phase separation temperature), the polymer forms hydrogen bond with the side groups of another adjacentPoly(N-isopropylacrylamide) molecule. Accordingly, it will expel the water from its structure. In addition, in the stage of water absorbing (low temperature), when a $H_2O$ molecule binds to the polymer via an hydrogen bond, a specific space steric conformation will be formed, and such structure is actually favorable for the next $H_2O$ molecule to bind to the same polymer next to the first $H_2O$ molecule. That's why Poly (N-isopropylacrylamide) can absorb a huge amount of water from the atmosphere. In such a way, the absorbing material in the device works like a self-propelled pump to continuously pump the water from the atmospheric air to the water container of the present invention.

Furthermore, the water collection device of the present invention can also use other materials that have a similar property. Examples would be various modified forms of Poly(N-isopropylacrylamide), and Poly(vinylphosphonate), refer to FIG. 2 for its structure. They could be used to replace Poly(N-isopropylacrylamide) as the water absorbing material in the device of the present invention. Further examples could be hydroxypropylcellulose, poly(vinylcaprolactame) and polyvinyl methyl ether. All of them have shown temperature responsive properties in the aqueous solution. Thus they can be used as the water absorbing materials of the water collection device. In addition, the choice of thermoresponsive polymer is not limited to linear forms of the polymer, it also include other architectural arrangements such as crosslinked form, brushes, graft copolymer, random copolymer . . . etc.

Concerning the phase separation temperature, it can be adjusted to the temperature as low as 5° C. and as high as 90° C. This can be achieved by change the concentration or type of the thermoresponsive polymer. Alternatively, it may be achieved through modifications of the structure of a certain thermoresponsive polymer. Accordingly, the water collection device with various absorbing material can work in different areas on earth. In the present invention, the Poly(N-isopropylacrylamide) as water absorbing material has the transition temperature (phase separation temperature) at 32° C. And this particular temperature has potential beneficial effects.

Concerning the regions where the fresh water resource is scarce, a large number of them are the desert areas or coastal arid areas. In such areas, the average daily high temperature is easily becoming higher than 32° C.; while at night, it would be quite lower than 32° C. In addition, in many of such dry coastal areas, the early morning fogs are regular phenomena as the cold and humid air currents travelling from the ocean inwards into the coastal arid area. Since rainfall is scarce there, the application of the device to collect the moisture from the air will significantly contribute to the fresh water supply in those arid areas. The water collection device with Poly(N-isopropylacrylamide) as water absorbing material has significant advantages in comparison to other fresh water generation approaches.

During the operation, it does not need any energy input from human to separate the fresh water from dissolved materials, such as salt; it also does not need any energy input from human to remove the collected water from the absorbing material. Only the natural and sun light (solar radiation) will do all the work to drive the device to function as purported. From night to early morning, the temperature is lower than 32° C., the transition temperature, and the humid fog that is rich of moisture, is in the atmospheric air; so the absorbing material absorbs the moisture from the air. In this way, it collects water from the humid air. Later on, after sunrise, the temperature will rise quickly, and by the noon till the early afternoon, the temperature will be higher than 32° C. Thus the water absorbing material that is the thermoresponsive polymer will automatically undergo conformation change. Accordingly, the water collected in it will be expelled to the water collector. Next, when the night comes, the temperatures drops below the transition temperature again; accordingly the water absorbing material will automatically convert its conformation and to be prepared to the next morning's fog. The whole system is driven by the nature, the sun light, and no any human input energy is required.

Therefore, such device can be placed in many coastal arid regions around the world. Moreover, the water absorbing material can be used independently. Alternatively, it can be grafted on the surface of a supporting element. In such a way, the contacting area of the absorbing material to the moisture in the air is significantly increased, which will further increase the water collection efficiency of the device.

It is also possible to utilize the mechanical pressure exerted by the thermoresponsive polymer when it undergoes the transition. This pressure might be small but it can be harvested by using piezoelectric material that can generate electricity when a pressure is applied on them.

Although the invention has been explained in relation to its preferred embodiment, it is to be understood that many other possible modifications and variations can be made without departing from the spirit and scope of the invention as herein described.

What is claimed is:

1. A device for collecting water from atmospheric moisture, comprising
    a water absorbing material;
    a protection wall;
    a water container;
    said water absorbing material absorbing water from the atmospheric moisture;
    said protection wall protecting said water absorbing material and said water collector from being contaminated or damaged;
    said protection wall allowing air to pass through with no hindrance; and
    said water container being connected to said water absorbing material so as to collect the water from said water absorbing material
    said water absorbing material being a temperature responsive polymer with a phase separation temperature;
    said temperature responsive polymer undergoing water solubility change when its temperature goes from above said phase separation temperature to below said phase separation temperature;
    said temperature responsive polymer undergoing water solubility change when its temperature goes from below said phase separation temperature to above said phase separation temperature;
    when its temperature is below said phase separation temperature, said temperature responsive polymer being in a swollen hydrated state, and said temperature responsive polymer forming hydrogen bond with water molecules;
    when its temperature is below said phase separation temperature, said temperature responsive polymer absorbing water from atmospheric moisture;
    when its temperature is above said phase separation temperature, said temperature responsive polymer being in a shrunken dehydrated state, and said temperature responsive polymer forming hydrogen bond with side groups of adjacent temperature responsive polymer molecule; and
    when its temperature is above said phase separation temperature, said temperature responsive polymer expelling water from its structure, and
    said temperature responsive polymer being selected from the group consisting of hydroxypropylcellulose, poly(vinylcaprolactame) and polyvinyl methyl ether.

2. The device for collecting water from atmospheric moisture of claim 1, comprising
    said protection wall being in a porous form to allow air with moisture to pass through; and
    said protection wall being made of a material that does not absorb moisture from air.

3. The device for collecting water from atmospheric moisture of claim 1, comprising
    said water container being made of a material that does not absorb moisture from air; and
    said water container comprising means to prevent the water contained in said container from evaporating to air.

4. The device for collecting water from atmospheric moisture of claim 1, comprising
    said phase separation temperature being 32° C.

5. A device for collecting water from atmospheric moisture, comprising
    a water absorbing material;
    a protection wall;
    a water container;

said water absorbing material absorbing water from the atmospheric moisture;

said protection wall protecting said water absorbing material and said water collector from being contaminated or damaged;

said protection wall allowing air to pass through with no hindrance; and said water container being connected to said water absorbing material so as to collect the water from said water absorbing material said water absorbing material being a temperature responsive polymer with a phase separation temperature;

said temperature responsive polymer undergoing water solubility change when its temperature goes from above said phase separation temperature to below said phase separation temperature;

said temperature responsive polymer undergoing water solubility change when its temperature goes from below said phase separation temperature to above said phase separation temperature;

when its temperature is below said phase separation temperature, said temperature responsive polymer being in a swollen hydrated state, and said temperature responsive polymer forming hydrogen bond with water molecules;

when its temperature is below said phase separation temperature, said temperature responsive polymer absorbing water from atmospheric moisture;

when its temperature is above said phase separation temperature, said temperature responsive polymer being in a shrunken dehydrated state, and said temperature responsive polymer forming hydrogen bond with side groups of adjacent temperature responsive polymer molecule; and said temperature responsive polymer being Poly(vinylphosphonate).

6. The device for collecting water from atmospheric moisture of claim 1, comprising said phase separation temperature being adjustable from 5° C. to 90° C.; and said phase separation temperature being adjusted via altering type of said temperature responsive polymer, concentration of said temperature responsive polymer, or modifying said temperature responsive polymer's structure.

7. The device for collecting water from atmospheric moisture of claim 1, comprising said temperature responsive polymer being a standing alone component of said device, or said temperature responsive polymer being grafted on a surface of a supporting element.

8. A device for collecting water from atmospheric moisture, comprising a water absorbing material;

a protection wall;

a water container;

said water absorbing material absorbing water from the atmospheric moisture;

said protection wall protecting said water absorbing material and said water collector from being contaminated or damaged;

said protection wall allowing air to pass through with no hindrance;

said water container being connected to said water absorbing material so as to collect the water from said water absorbing material;

said protection wall being in a porous form to allow air with moisture to pass through;

said protection wall being made of a material that does not absorb moisture from air;

said water container being made of a material that does not absorb moisture from air; and said water container comprising means to prevent the water contained in said container from evaporating to air;

said water absorbing material being a temperature responsive polymer with a phase separation temperature, said temperature responsive polymer undergoing water solubility change when its temperature goes from above said phase separation temperature to below said phase separation temperature;

said temperature responsive polymer undergoing water solubility change when its temperature goes from below said phase separation temperature to above said phase separation temperature;

when its temperature is below said phase separation temperature, said temperature responsive polymer being in a swollen hydrated state, and said temperature responsive polymer forming hydrogen bond with water molecules;

when its temperature is below said phase separation temperature, said temperature responsive polymer absorbing water from atmospheric moisture;

when its temperature is above said phase separation temperature, said temperature responsive polymer being in a shrunken dehydrated state, and said temperature responsive polymer forming hydrogen bond with side groups of adjacent temperature responsive polymer molecule; and when its temperature is above said phase separation temperature, said temperature responsive polymer expelling water from its structure, said temperature responsive polymer being selected from the group consisting of hydroxypropylcellulose, poly(vinylcaprolactame), polyvinyl methyl ether, and Poly(vinylphosphonate).

9. The device for collecting water from atmospheric moisture of claim 8, comprising said phase separation temperature being 32° C.

10. The device for collecting water from atmospheric moisture of claim 8, comprising said phase separation temperature being adjustable from 5° C. to 90° C.; and said phase separation temperature being adjusted via altering type of said temperature responsive polymer, concentration of said temperature responsive polymer, or modifying said temperature responsive polymer's structure.

11. A device for collecting water from atmospheric moisture, comprising a water absorbing material;

a protection wall;

a water container;

said water absorbing material absorbing water from the atmospheric moisture;

said protection wall protecting said water absorbing material and said water collector from being contaminated or damaged;

said protection wall allowing air to pass through with no hindrance;

said water container being connected to said water absorbing material so as to collect the water from said water absorbing material;

said protection wall being in a porous form to allow air with moisture to pass through;

said protection wall being made of a material that does not absorb moisture from air;

said water container being made of a material that does not absorb moisture from air;

said water container comprising means to prevent the water contained in said container from evaporating to air;

said water absorbing material being a temperature responsive polymer with a phase separation temperature;

said temperature responsive polymer undergoing water solubility change when its temperature goes from above said phase separation temperature to below said phase separation temperature;

said temperature responsive polymer undergoing water solubility change when its temperature goes from below said phase separation temperature to above said phase separation temperature;

when its temperature is below said phase separation temperature, said temperature responsive polymer being in a swollen hydrated state, and said temperature responsive polymer forming hydrogen bond with water molecules;

when its temperature is below said phase separation temperature, said temperature responsive polymer absorbing water from atmospheric moisture;

when its temperature is above said phase separation temperature, said temperature responsive polymer being in a shrunken dehydrated state, and said temperature responsive polymer forming hydrogen bond with side groups of adjacent temperature responsive polymer molecule;

when its temperature is above said phase separation temperature, said temperature responsive polymer expelling water from its structure; and said temperature responsive polymer being a standing alone component of said device, or said temperature responsive polymer being grafted on a surface of a supporting element; and said temperature responsive polymer being selected from the group consisting of hydroxypropylcellulose, poly (vinylcaprolactame), polyvinyl methyl ether, and Poly (vinylphosphonate).

12. The device for collecting water from atmospheric moisture of claim 11, comprising said phase separation temperature being 32° C.

13. The device for collecting water from atmospheric moisture of claim 11, comprising said phase separation temperature being adjustable from 5° C. to 90° C.; and said phase separation temperature being adjusted via altering type of said temperature responsive polymer, concentration of said temperature responsive polymer, or modifying said temperature responsive polymer's structure.

* * * * *